United States Patent [19]

Plotnikoff

[11] 3,865,934
[45] Feb. 11, 1975

[54] METHOD OF ENHANCING MEMORY AND LEARNING

[75] Inventor: Nicholas Peter Plotnikoff, Lake Bluff, Ill.

[73] Assignee: Abbott Laboratories, North Chicago, Ill.

[22] Filed: Apr. 2, 1973

[21] Appl. No.: 343,058

[52] U.S. Cl. .............................................. 424/177
[51] Int. Cl. ........................................... A61k 27/00
[58] Field of Search .................................... 424/177

[56] References Cited
OTHER PUBLICATIONS

Chemical Abstracts 76: 68548j (1972)

Chemical Abstracts 77: 72302n (1972)

*Primary Examiner*—Jerome D. Goldberg
*Attorney, Agent, or Firm*—Paul D. Burgauer; Robert L. Niblack

[57] ABSTRACT

A method for enhancing learning and memory retention comprising administering a small dose of the tripeptide pyro-L-glutamyl-L-histidyl-L-prolinamide to a warm-blooded animal.

5 Claims, No Drawings

METHOD OF ENHANCING MEMORY AND LEARNING

DETAILED DESCRIPTION OF THE INVENTION

The present invention is directed to the enhancement of learning ability and memory retention in normal, warm-blooded animals and such animals that may suffer from an impairment in this area. It has been found that extremely low doses of pyro-L-glutamyl-L-histidyl-L-prolinamide (hereinafter simply referred to as TRH) administered orally, intramuscularly or intravenously as a single dose or in repeated doses markedly increase memory, retention and learning ability of warm-blooded animals. This effect can easily be demonstrated in the animal model by the conditioned avoidance response in the maze test. Significantly shortened escape times resulted with animals treated with TRH in respect to an acquisition test and retention trials in rats. Pretreatment of the rats during training trials result in increased acquisition rates in comparison to control rats treated with saline. The TRH treatment produced marked and prolonged retention of the learned knowledge.

In order to illustrate the method of the present invention, reference is made to the following examples which, however, are not meant to limit the invention in any respect.

EXAMPLE 1

A simple maze test was used to study the behavioral effects of TRH on young Long Evans rats weighing 80–120 g. Naive rats were trained in ten acquisition trials to discriminate between light and dark compartments in a maze. The maze consisted of a rectangular chamber, 24 inches long, 10 inches wide and 12 inches high; one half of the chamber was further divided into a dark and a lighted side. Scrambled electric shocks (100 volts) were delivered to the grid floor in the undivided section and in the dark part of the divided section.

A teaching procedure was started by placing a single rat into the undivided section of the chamber. At the same time, a buzzer was sounded for 10 seconds followed by 5 seconds of footshock and buzzer. The correct response was for the animal to escape to the lighted section of the divided half of the chamber which was shock-insulated. 10 trials were given, each time alternating the lighted (insulated) section of the maze. The intertrial periods were approximately 10 minutes.

The behavioral effects resulting from TRH administration and similar control tests were measured by recording the escape period, i.e., the time elapsing between entrance of the rat into the chamber until it found its way into the insulated part of the chamber. The test animals were given an oral dose of 1 mg./kg. of TRH 1 hour prior to the initiation of 10 acquisition trials. Control and test groups each comprised eight animals which were, of course, tested individually. The results are shown in Table I. In all instances, the animals used as controls were given the same volume of water while the test animals received an aqueous solution of 0.05 percent by weight of TRH by gavage.

TABLE I

| Acquisition Trial No. | Escape Time (Seconds ± Standard Deviation) | |
|---|---|---|
| | Controls | Test Animals |
| 1 | 14.2 ± 0.4 | 14.2 ± 0.3 |
| 2 | 13.0 ± 0.9 | 14.6 ± 0.3 |
| 3 | 8.8 ± 1.4 | 8.6 ± 1.9 |
| 4 | 9.5 ± 2.1 | 9.2 ± 1.7 |
| 5 | 6.7 ± 1.8 | 5.1 ± 1.7 |
| 6 | 8.6 ± 2.1 | 7.6 ± 1.7 |
| 7 | 3.3 ± 1.3 | 6.1 ± 1.8 |
| 8 | 8.5 ± 2.1 | 7.5 ± 1.8 |
| 9 | 3.5 ± 1.4 | 3.2 ± 1.4 |
| 10 | 7.8 ± 1.8 | 4.6 ± 1.2 |
| Overall Mean | 8.4 ± 0.7 | 8.0 ± 0.7 |

Although the learning level in this test does not show a highly significant difference between control and test animals, a learning improvement is apparent and is further substantiated by the data shown in Example 2.

EXAMPLE 2

The animals of Example 1 were retested on the day following the acquisition procedure of Example 1 in the same chamber; however, in this follow-up test, no electric shock, only the buzzer was used. All other parameters were identical to those described above. The test results are recorded in Table II and again, the means of eight animals were combined for each entry.

TABLE II

| Trial No. | Escape Time (Seconds ± Standard Deviation) | |
|---|---|---|
| | Control Animals | Test Animals |
| 1 | 6.0 ± 1.9 | 4.2 ± 1.2 |
| 2 | 10.2 ± 1.7 | 6.1 ± 1.9 |
| 3 | 6.3 ± 1.8 | 2.6 ± 0.7 |
| 4 | 5.7 ± 1.9 | 5.0 ± 1.5 |
| 5 | 5.6 ± 1.7 | 2.0 ± 0.3 |
| 6 | 5.7 ± 2.0 | 3.0 ± 0.9 |
| 7 | 3.0 ± 1.6 | 1.6 ± 0.2 |
| 8 | 6.0 ± 2.0 | 2.5 ± 0.6 |
| 9 | 3.1 ± 1.6 | 2.2 ± 0.4 |
| 10 | 6.1 ± 1.9 | 2.0 ± 0.3 |
| Overall Mean | 5.7 ± 0.8 | 3.1 ± 0.3 |

The recorded results clearly show a pronounced improvement in memory retention with the TRH-treated animals over the control animals. In turn, this memory improvement indicates the higher learning level of the animals undergoing training on the previous day.

While the above studies were carried out by oral administration of TRH at a dose of 1 mg./kg., a suitable range for enhancing learning and memory levels with TRH is between 0.1 and 20 mg./kg. or an intramuscular administration of 0.01 to 10 mg./kg. Using the intravenous route, a dose range of 0.005 to 10 mg./kg. gives good result. Of course, the preferred administration route is the oral route with a daily dose of 0.1 to 4 mg./kg. In view of the extremely low toxicity of TRH, such doses may be repeated daily over periods of many weeks.

For parenteral administration, the TRH is simply dissolved in water and, if desired, the solution is made isotonic and/or buffered to a pH between 7.0 and 7.8. Where storage for extended periods of time is required, a preservative such as benzyl alcohol may be added at a level of 0.5–3 percent by weight of the solution.

For oral administration, tablets, wafers, suspensions, elixirs, pills and syrups can be made using the usual pharmaceutically acceptable diluents, carriers and/or fillers. Preferably, such oral compositions are made in unit dosage form.

What is claimed is:

1. The method of enhancing acquisition rate or retention level impairment in a warm-blooded animal comprising administering to an animal having an impaired rate of learning or retention an effective dose of L-pyroglutamyl-L-histidyl-L-prolinamide.

2. The method of claim 1 wherein said dose is administered orally.

3. The method of claim 2 wherein said dose is given in an amount of between 0.1 and 20 mg./kg.

4. The method of claim 1 wherein said dose is given parenterally in an amount of between 0.005 and 10 mg./kg.

5. The method of claim 1 wherein said dose is administered in unit dosage form.

* * * * *